July 11, 1961 G. J. REISCH 2,991,798
EVAPORATIVE COOLER WATER CONTROL
Filed Sept. 14, 1959 2 Sheets-Sheet 1

Inventor:
George J. Reisch,
by Leonard J. Platt
His Attorney.

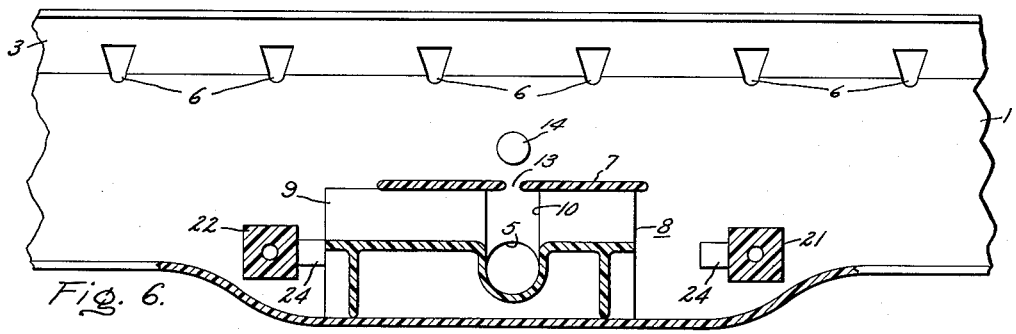
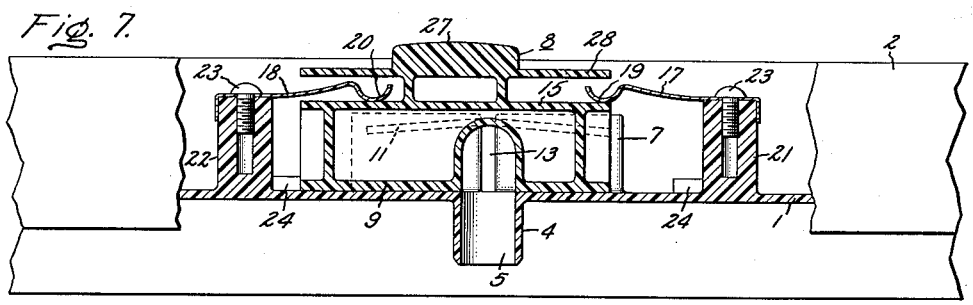
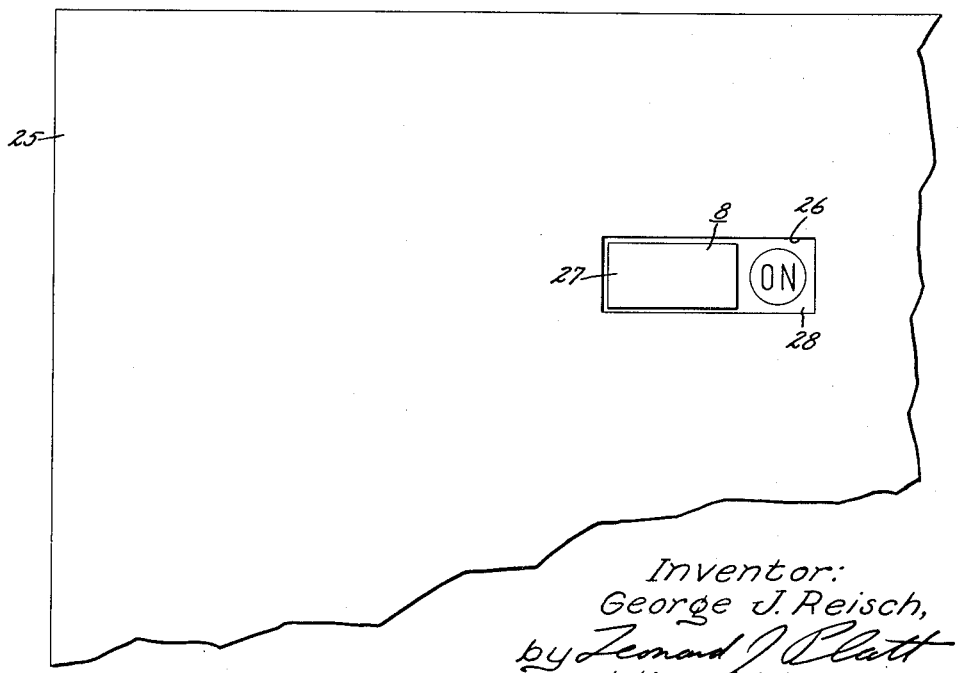

United States Patent Office 2,991,798
Patented July 11, 1961

2,991,798
EVAPORATIVE COOLER WATER CONTROL
George J. Reisch, Shelton, Conn., assignor to General Electric Company, a corporation of New York
Filed Sept. 14, 1959, Ser. No. 839,670
10 Claims. (Cl. 137—592)

This invention relates to an evaporative cooler, and more particularly to an arrangement for controlling the flow of water onto an evaporative cooler water distribution tray.

In the manufacture of evaporative coolers, it has been customary to provide a water distribution tray having a plurality of openings formed therein for distributing water through an evaporative cooler pad. A pump is provided for conveying water from the bottom of the evaporative cooler upwardly to the water distribution tray. The formation of a satisfactory arrangement for controlling the flow of water onto the tray mentioned above, involves many problems, one of which deals with discharging a relatively large quantity of water onto the tray without having the water splash over the tray.

Accordingly, it is a primary object of this invention to provide an improved control arrangement for discharging water onto the tray of an evaporative cooler without splashing the water over the tray.

It is another object of this invention to provide a water control arrangement which is simple in structure, and which may be easily manufactured and installed in an evaporative cooler.

In accordance with one aspect of this invention, a water inlet opening is formed in the bottom wall of an evaporative cooler water tray, and a slideable water director is positioned over the water inlet opening. A slot formed in the water director is adapted to register with the water inlet opening to form an unrestricted passage for the flow of water through the opening and slot. The water director includes a deflector wall positioned above and spaced from the slot for directing water downwardly against the bottom wall of the water tray. By this arrangement, a very simple, yet effective, means for discharging a relatively large quantity of water onto the water tray of an evaporative cooler without having the water splash over the tray is achieved.

Other objects and attendant advantages of this invention will be apparent from the following description taken in connection with the accompanying drawing in which:

FIG. 6 is a cross-sectional view of the water control arrangement taken along the line 6—6 of FIG. 2;

FIG. 7 is a cross-sectional view of the water control taken along the line 7—7 of FIG. 1; and FIG. 8 is a plan view of an evaporative cooler with the improved water control arrangement.

Figure 1:
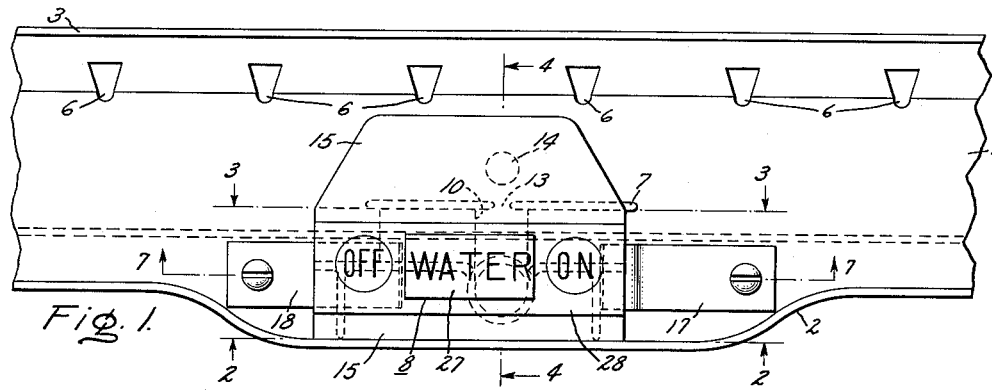
FIG. 1 is a plan view of an evaporative cooler water distribution tray embodying the invention.
Figure 2:
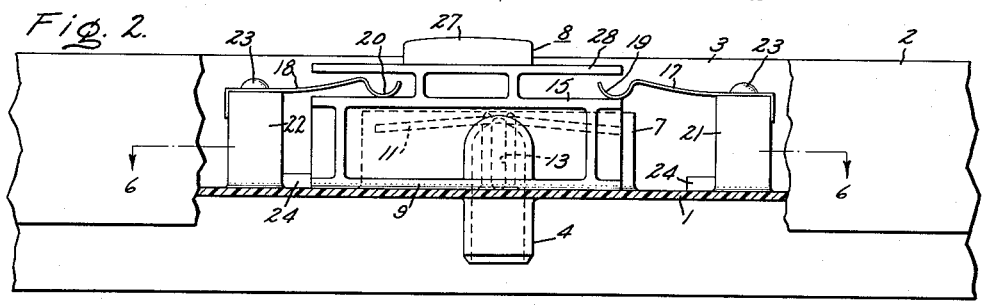
FIG. 2 is a front elevational view, partially in cross-section, showing the improved water control arrangement.
Figure 4:
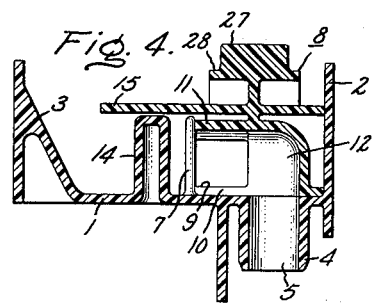
FIG. 4 is a cross-sectional view taken along the line 4—4 of FIG. 1.

Referring now to FIGS. 1 and 2 of the drawing, there is illustrated an evaporative cooler water distribution tray having a bottom wall 1, a side wall 2 extending upwardly generally perpendicular to the bottom wall, and an opposite side wall 3 inclined with respect to the bottom wall. The water distribution tray is preferably molded from a plastic such as polystyrene or the like. As best seen in FIG. 4, a water inlet conduit 4 having a water inlet opening 5 extending through the bottom wall 1 is preferably molded integrally with the water distribution tray. A flexible hose (not shown) may be slipped over the outer periphery of the water conduit 4 for delivering water from a pump (not shown) to the water inlet opening 5. In the usual manner, as shown in FIG. 1, a plurality of triangular shaped openings 6 are formed in the lower portion of side wall 3 of the water distribution tray to permit the water in the tray to flow through the triangular openings 6 and proceed downwardly through an evaporative cooler pad (not shown). The water inlet opening 5 is approximately ⅜″ in diameter and water squirts through the opening at approximately a gallon and a half a minute.

A uniquely designed arrangement is provided for turning the water on and off and for uniformly supplying the water distribution tray with water without impeding the flow of water through inlet opening 5, and without splashing the water over the sides of the water distribution tray. As shown in FIGS. 6 and 7, this arrangement includes a guide wall 7, preferably molded integrally with the water distribution tray, for guiding a water director 8. As shown, the director 8 is positioned between wall 2 of the water tray and guide wall 7. The director is preferably formed of plastic or other suitable low cost material, and as shown in FIGS. 6 and 7, includes a generally horizontal flat bottom plate 9. A U-shaped slot 10 is formed in bottom plate 9 for registering with opening 5 to permit water to flow through the opening. As shown more particularly in FIG. 7, a slanted deflector plate 11 formed integrally with director 8 extends over slot 10 for deflecting water downwardly in two streams away from slot 10. As best seen in FIGS. 4 and 6, the director 8 also includes a concave elbow wall 12 which extends upwardly from slot 10 for directing water through a relatively narrow slot 13 formed in the guide wall 7. An upstanding generally cylindrical baffle post 14 is integrally molded with the water distribution tray for deflecting the water which flows through slot 13 into two streams to prevent it from swishing upwardly over side wall 3. In addition, the director 8 includes a generally flat intermediate plate 15 spaced upwardly from bottom plate 9 and arranged generally parallel thereto. Thus, the overhanging left portion of the intermediate plate 15 acts as a deflector to keep the water down in the bottom of the water distribution tray as it squirts through slot 13. Accordingly, this unique arrangement permits a relatively large quantity of water to flow smoothly to one side or the other of the water distribution tray or through slot 13 and around baffle post 14 without splashing over the sides of the tray.

Figure 3:
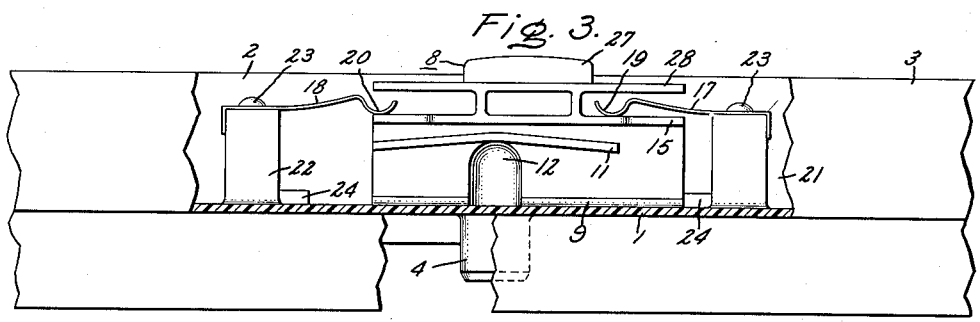
FIG. 3 is a rear elevational view, partially in cross-section taken along the line 3—3 of FIG. 1.
Figure 5:
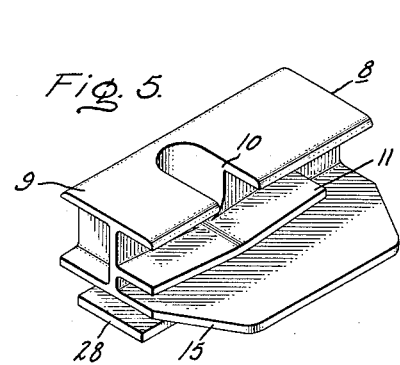
FIG. 5 is a perspective view of the water distributor showing the distributor in an up-side-down position.

The director 8 is guided for slideable movement between the water "On" position, illustrated in FIG. 3, wherein the slot 10 formed therein is in register with opening 5; and the "Off" position, wherein the bottom plate 9 of the deflector covers opening 5 to prevent water from flowing therethrough. As shown more particularly in FIG. 4, the right edge of the intermediate plate 15 is arranged for sliding contact with side wall 2. The water deflector plate 11 also extends to the left, as viewed in FIG. 4, the same distance as the bottom plate 9 to provide guiding contact with guide wall 7. In addition, as viewed in FIG. 4, the director 8 is guided at the left and right sides of bottom plate 9. Accordingly, because of the plurality of guide surfaces, manufacturing tolerances for the unique director and water distribution tray arrangement may be relatively large. Thus, a very simple, yet effective, readily manufactured, low cost water control arrangement is achieved.

Spring means is provided for urging the bottom plate 9 of the director 8 against the bottom wall 1 of the water distribution tray. As shown more particularly in FIG. 3, this spring means takes the form of two spring clips 17 and 18, each being provided with a curved end 19 and 20, respectively, for sliding on the upper surface of intermediate plate 15. As shown, the other end of each of the clips 17 and 18 may be secured conveniently to mounting posts 21 and 22, respectively, by means of self threading screws 23, or other suitable securing means. Thus, the curved ends 19 and 20 of the clips are biased against the upper surface of intermediate plate 15.

As shown more particularly in FIG. 8, the evaporative cooler includes a housing 25 having a generally rectangular slot 26 formed in the upper portion thereof. A control knob 27 integrally formed with the water director 8 extends upwardly through the slot so that the director may be moved readily to the left or right as viewed in FIG. 8. A shown in FIGS. 7 and 8, a top indicia plate 28 may be molded integrally with the director and provided with the words "On" and "Off" on opposite sides of knob 27. The top plate 28 is located beneath the housing, and the slot 26 is made just large enough so that either the word "On" or the word "Off" is visible from outside of the housing through the slot. Referring now to FIG. 3, stops 24 may be conveniently provided on the sides of posts 21 and 22 for limiting leftward and rightward movement of the director 8.

From the foregoing description it will be appreciated that the improved water control arrangement comprises two basic parts, a uniquely formed water tray, and a uniquely molded water director. Further, the water director may be quickly and inexpensively assembled to the water tray by simply dropping it into position and attaching two spring slips. Thus, an exceedingly simple and inexpensive water director arrangement is provided for controlling the flow of water onto an evaporative cooler tray without having the water splash over the tray.

While there has been shown and described a particular embodiment of this invention, it will be obvious to those skilled in the art that various changes and modifications can be made therein without departing from the invention, and therefore, it is aimed in the appended claims to cover all such changes and modifications as fall within the true spirit and scope of the invention.

What I claim as new and desire to secure by Letters Patent of the United States is:

1. In an evaporative cooler: a water tray having a bottom wall; a water inlet opening formed in said bottom wall; a water director positioned over said water inlet opening; a slot formed in said water director adapted to register with said water inlet opening to form an unrestricted passage for the flow of water; and a water deflector wall formed integrally with said water director positioned above and spaced from said slot for directing water against the bottom wall of said water tray.

2. In an evaporative cooler: a water tray having a bottom wall; a water inlet opening formed in said bottom wall; a slideable water director positioned over said water inlet opening; a slot formed in said water director adapted to register with said water inlet opening to form an unrestricted passage for the flow of water; means for holding the director against the bottom wall of the tray; and a water deflector wall formed integrally with said water director positioned above and spaced from said slot for directing water in two streams against the bottom wall of said water tray.

3. In an evaporative cooler: a water tray having a bottom wall; a water inlet opening formed in said bottom wall; a slideable water director positioned over said water inlet opening; a slot formed in said water director adapted to register with said water inlet opening to form an unrestricted passage for the flow of water; spring clip means for holding the director against the bottom wall of the water distribution tray; and a water deflector wall formed integrally with said water director positioned above and spaced from said slot for directing water against the bottom wall of said water tray.

4. In an evaporative cooler: a housing; a water tray having a bottom wall positioned within said housing; a water inlet opening formed in said bottom wall; a slideable water director positioned over said inlet opening; a slot formed in said director adapted to register with said water inlet opening for forming an unrestricted passage for the flow of water; a deflector wall integrally formed with said water director for deflecting water downwardly against the bottom wall of the water tray; and a manually operable control knob integrally formed with said director for sliding said director along the bottom wall to open or close said water inlet opening, said control knob extending through said housing.

5. In an evaporative cooler: a housing; a water tray having a bottom wall positioned within said housing; a water inlet opening formed in said bottom wall; a slideable water director positioned over said inlet opening; a slot formed in said director adapted to register with said water inlet opening for forming an unrestricted passage for the flow of water; a manually operable control knob integrally formed with said director for sliding said director along the bottom wall to open or close said water inlet opening; a top plate formed integrally with said water director positioned within said housing; "On" and "Off" indicia located on said top plate on opposite sides of said control knob; a slot formed in said housing, said slot being large enough to permit said control knob to extend through the housing and one or the other of said indicia to be viewed from outside of the housing depending upon the position of the water director.

6. In an evaporative cooler: a water tray having a bottom wall; a water inlet opening formed in said bottom wall; a water director positioned over said water inlet opening; a guide wall extending upwardly from the bottom wall of said water tray for guiding said water director; a slot formed in said guide wall adjacent to the water inlet opening; and a slot formed in said water director adapted to register with said water inlet opening to form an unrestricted passage for the flow of water from said opening to the slot in the guide wall.

7. In an evaporative cooler: a water tray having a bottom wall; a water inlet opening formed in said bottom wall; a water director positioned over said water inlet opening; a guide wall extending upwardly from the bottom wall of said water tray for guiding said water director; a slot formed in said guide wall adjacent to the water inlet opening; a slot formed in said water director adapted to register with said water inlet opening to form an unrestricted passage for the flow of water from said opening to the slot in the guide wall; and a baffle post extending upwardly from said bottom wall adjacent to the slot in the guide wall for directing water in opposite directions from the slot in the guide wall.

8. In an evaporative cooler: a water tray having a bottom wall; a water inlet opening formed in said bottom wall; a water director positioned over said water inlet opening; a guide wall extending upwardly from the bottom wall of said water tray for guiding said water director; a slot formed in said guide wall adjacent to the water inlet opening; a slot formed in said water director adapted to register with said water inlet opening to form an unrestricted passage for the flow of water from said opening to the slot in the guide wall; a baffle post extending upwardly from said bottom wall adjacent to the slot in the guide wall for directing water in opposite directions from the slot in the guide wall; and an intermediate plate formed integrally with said director extending over said guide wall and baffle post for keeping the water down in the bottom of the water tray as it squirts through the slot in the guide wall and around the baffle post.

9. In an evaporative cooler: a water tray having a bottom wall; a water inlet opening formed in said bottom wall; a water director positioned over said water inlet opening; a guide wall extending upwardly from the bottom wall of said water tray for guiding said water director; a slot formed in said guide wall adjacent to the water inlet opening; a slot formed in said water director adapted to register with said water inlet opening to form an unrestricted passage for the flow of water from said opening to the slot in the guide wall; and a concave elbow wall formed integrally with said water director extending generally upwardly from the slot in the director for directing water from said opening toward the slot in the guide wall.

10. In an evaporative cooler: a water tray having a bottom wall; a water inlet opening formed in said bottom wall; a slideable water director positioned over said water inlet opening; a slot formed in said director adapted to register with said water inlet opening for forming an unrestricted passage for the flow of water, a manually operable control knob integrally formed with said director for sliding said director along the bottom wall to open or close said water inlet opening; and stop means formed integrally with said water tray and extending upwardly therefrom on opposite sides of said director for restricting slideable movement of said director.

References Cited in the file of this patent

UNITED STATES PATENTS 2,612,183     Langdon _____ Sept. 30, 1952